Patented Feb. 2, 1932

1,843,284

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

RESIN ACID ESTER AND METHOD OF PRODUCING

No Drawing.  Application filed October 9, 1929.  Serial No. 398,578.

My invention relates to resin acid esters and method of producing and more particularly relates to resin acid esters prepared from a dichloro ether and to the method for producing such esters.

In carrying the method in accordance with my invention into practice for the preparation of esters embodying my invention, the resin acid to be esterified is heated with a chloro ether in the presence of an alkali and desirably also, though not necessarily in all cases, of alcohol, excess chloro ether, any excess alcohol, if present, and free resin acid are distilled off when the reaction is completed and the ester is obtained as a residue. Desirably, the esterification is effected under pressure and any excess chloro ether and alcohol are distilled off under atmospheric pressure, while free resin acid is desirably removed by distillation under reduced pressure.

In the practical adaptation of my invention resin acids, such as abietic acid, pimaric acid, etc., may be esterified, and such may be treated in a pure or relatively pure state, or as present in either wood or gum rosin, sandarac, pontianak, etc. Various chloro ethers may be used, as for example, dichloroethyl ether, chloromethyl ether and s-dichloro dimethyl ether, etc., for the production of various resin acid esters. In carrying out the treatment various alkalis, as for example, sodium hydroxide, sodium carbonate, lime, potassium hydroxide, and the like, may be used and such alcohols, as ethyl, amyl, isopropyl, butyl, etc., will be found satisfactory as solvents.

By way of illustration, the diglycol diabietate ester of rosin may be prepared by heating rosin and diglycol together, or by heating together sodium abietate and B, B' dichloroethyl ether, preferably in alcoholic solution. Where the dichloroethyl ether is heated, preferably under pressure, with alcoholic sodium resinate, both chlorine atoms are removed with the formation of diglycol diabietate. The reaction may be illustrated as follows:

$Cl.CH_2.CH_2O.CH_2.CH_2.Cl + 2C_{19}H_{29}COONa =$
  $2NaCl + C_{19}H_{29}COOCH_2.CH_2OCH_2.CH_2OOC.C_{19}H_{29}$

As a more specific example of the preparation of the diglycol ester of rosin, for example, a solution of 60 parts of sodium hydroxide and 500 parts of rosin in 700 parts of alcohol are heated with 110 parts of B, B' dichloroethyl ether for say about eight hours at a temperature of about 160° C. and under a pressure of about 175 pounds. After the heating period the alcohol is distilled off under atmospheric pressure and a small amount of free rosin is removed by heating to say about 300° C. under a pressure of about one-half inch of mercury. The residue, about 430 g. obtained after removal of the alcohol and free rosin will consist of diglycol diabietate, which will be somewhat softer than rosin and will have an acid number of 5.

As further illustration of the practical adaptation of my invention, for example, a rosin ester may be produced by refluxing 150 g. of dry sodium resinate, 300 g. of benzene and 25 g. of s-dichloro dimethyl ether for about ten hours, then water washing the solution to remove soap and distilling off the benzene. The product will amount to about 110 g., and will have a melting point of about 95° C., an acid number of about 82 and will contain about $\frac{4}{10}$% ash. The product will comprise about 50% rosin and 50% rosin ester, the rosin being separable from the ester by, for example, distillation under reduced pressure.

If desired, the esters produced in accordance with my invention may be hydrogenated, as for example, by subjecting them to a stream of hydrogen in the presence of a palladium or platinum catalyst at room temperature, or, for example, in the presence of a nickel catalyst at an elevated temperature. The hydrogenation is desirably, though not necessarily, carried out under pressure.

It will now be noted that in accordance with my invention various resin esters produced from chloro ethers are rendered available and it will be understood that I do not intend that my invention shall be limited to the precise details set forth herein.

Having now fully described my invention, what I claim and desire to protect by Letters Patent is:

1. The method of producing a resin ester which includes esterifying a natural resin acid with an aliphatic chloro-oxy ether.

2. The method of producing a resin ester which includes esterifying a natural resin acid with a dichloroethyl ether.

3. The method of producing a resin ester which includes heating a natural resin with an aliphatic chloro-oxy ether in the presence of an alkali.

4. The method of producing a resin ester which includes heating a natural resin with an aliphatic chloro-oxy ether in the presence of an alkali and a monohydric alcohol.

5. The method of producing an abietic acid ester which includes esterifying abietic acid with an aliphatic chloro-oxy ether.

6. The method of producing an abietic acid ester which includes esterifying abietic acid with a chloroethyl ether.

7. The method of producing a rosin acid ester which includes heating rosin with an alipathic dichloro-oxy ether in the presence of an alkali.

8. The method of producing a rosin acid ester which includes heating rosin with dichloroethyl ether in the presence of an alkali and a monohydric alcohol.

9. The method of producing an ester of abietic acid which includes heating sodium abietate with an aliphatic chloro-oxy ether.

10. The method of producing an ester of abietic acid which includes heating sodium abietate with an alipathic s-dichloro-oxy ether.

11. The method of producing diglycol diabietate which includes esterifying abietic acid with B, B' dichlorethyl ether.

12. The method of producing diglycol diabietate which includes esterifying abietic acid with B, B' dichlorethyl ether in the presence of a monohydric alcohol.

13. The method of producing diglycol diabietate which includes heating rosin and an alkali with B, B' dichlorethyl ether.

14. The method of producing diglycol diabietate which includes heating rosin and an alkali with B, B' dichlor-ethyl ether in the presence of a non-reactive solvent for the rosin.

15. The method of producing a resin acid ester which includes esterifying a rosin with a chloro methyl ether.

16. The method of producing a resin acid ester which includes esterifying a rosin with s-dichloro dimethyl ether.

17. The method of producing a resin acid ester which includes esterifying a rosin with a chloro methyl ether in the presence of an alkali and of a non-reactive solvent for the rosin.

18. The method of producing a resin acid ester which includes esterifying a rosin with s-dichloro dimethyl ether in the presence of an alkali and of a non-reactive solvent for the rosin.

19. The method of producing a resin acid ester which includes esterifying a rosin with a chloro methyl ether in the presence of an alkali and of a monohydric alcohol.

20. The method of producing a resin acid ester which includes esterifying a rosin with s-dichloro dimethyl ether in the presence of an alkali and of a monohydric alcohol.

In testimony of which invention, I have hereunto set my hand at Kenvil, N. J., on this 4th day of October, 1929.

IRVIN W. HUMPHREY.